United States Patent [19]

Matsumoto

[11] Patent Number: 4,530,277
[45] Date of Patent: Jul. 23, 1985

[54] CITRUS FRUIT SQUEEZER

[76] Inventor: Hideo Matsumoto, 1-22-7, Daitakubo, Urawa-Shi, Saitama-ken, Japan

[21] Appl. No.: 620,200

[22] Filed: Jun. 13, 1984

[30] Foreign Application Priority Data

Dec. 27, 1983 [JP] Japan ............... 58-198738[U]

[51] Int. Cl.³ ............... A23N 1/00; A47J 19/02
[52] U.S. Cl. ..................... 99/506; D7/48; 99/495; 100/131
[58] Field of Search ............ 99/495, 496, 501–508; D7/48, 49; 100/213, 131, 132, 133, 134

[56] References Cited

U.S. PATENT DOCUMENTS 602,088  4/1898  Morgan .................. 99/507
2,580,314  5/1971  Besora ................ 99/505 X Primary Examiner—Timothy F. Simone
Attorney, Agent, or Firm—Sprung, Horn, Kramer & Woods

[57] ABSTRACT

A citrus fruit squeezer including a reservoir having a cone-shaped support member on which a fruit to be squeezed is placed. A cover is pivotably supported by a peripheral portion of the reservoir. A pressing member is rotatably supported by the cover and is fitted on and over the fruit on the support member when the covers is pulled over and down against the reservoir. The pressing member is pressed against the fruit and rotated to squeeze juice from the fruit.

6 Claims, 5 Drawing Figures

CITRUS FRUIT SQUEEZER

BACKGROUND OF THE INVENTION

1. Field of the Invention

The present invention relates to a squeezer by which juice is squeezed from citrus fruit such as oranges, grapefruit, lemons, and the like, the squeezer being operated manually or mechanically.

2. Description of the Prior Art

In a conventional squeezer, an orange is first cut and the cut end placed on a cone-shaped fruit support member, and an inverted cup-shaped pressing member is placed over the orange. Downward pressure is then exerted on the pressing member until the juice of the orange is squeezed out of the flesh of the fruit. The juice flows down the surfaces of the support portion and is held in the bottom of the support portion, while the peel and pulped flesh of the orange remain on the fruit support member. However, a good proportion of the juice still remains in the pulp, and it is difficult to squeeze the fruit sufficiently to remove this remaining juice from the pulped flesh in a conventional squeezer.

SUMMARY OF THE INVENTION

Therefore, an object of the present invention is to provide a squeezer by which juice can be completely squeezed from a citrus fruit, and substantially no juice remains in the flesh of the fruit.

According to the present invention, there is provided a squeezer comprising a deep-sided, dish-shaped reservoir, a hinged cover, an inverted cup-shaped pressing member, and a rotating means.

The reservoir has a cone-shaped fruit support member formed on a bottom thereof, upon which the fruit is placed for squeezing. The fruit support member, and the bottom and an inner wall of the reservoir define a chamber in which juice squeezed from the fruit is contained. The cover is hinged to a first peripheral portion of the reservoir, and a free end of the cover can come close to a second peripheral portion of the reservoir. The pressing member is rotatably supported by the cover, and fits over and around the fruit support member when the free end of the cover is in a position close to the second peripheral portion of the reservoir. The rotating means is provided for rotating the pressing member about the axis thereof.

BRIEF DESCRIPTION OF THE DRAWINGS

The present invention may be more fully understood from the description of preferred embodiments of the invention set forth below, together with the accompanying drawings, in which.

DESCRIPTION OF THE PREFERRED EMBODIMENTS

Figure 1:
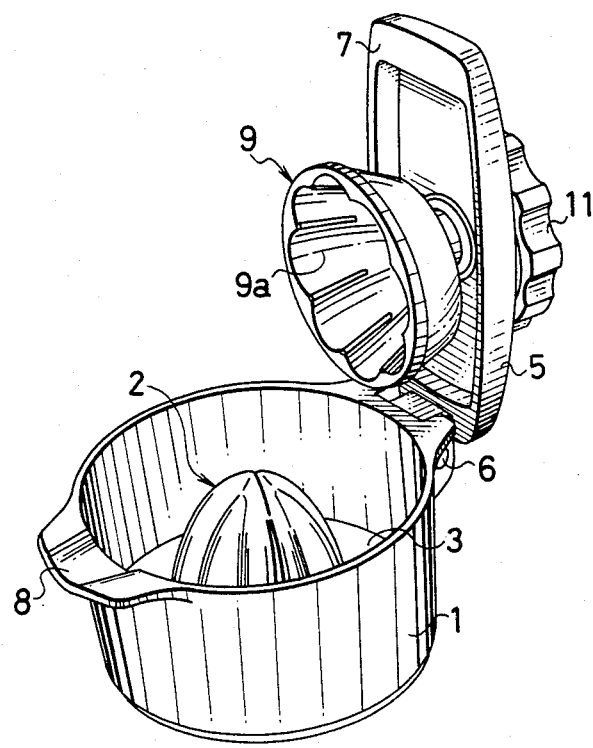
FIG. 1 is a perspective view of an embodiment of the present invention.

Referring to FIGS. 1 to 4, a deep-sided, dish-shaped reservoir 1 has a cone-shaped fruit support member 2 formed on a bottom 3 thereof. The outer surface of the support member 2, the bottom, and the inner wall of the reservoir 1 define a juice-holding chamber 4 wherein juice squeezed from a fruit is contained. The fruit to be squeezed is placed on the top portion of the support member 2.

A cover 5 is hinged to a first peripheral portion of the reservoir 1 by a pin 6. A free end 7 of the cover 5 can come close to a second peripheral portion, which is opposite the first peripheral portion and on which a beak 8 is formed. The beak 8 protrudes outward, to enable the juice contained in the chamber 4 to be poured into another container. The cover 5 has a length longer than the diameter of the reservoir 1, the end of the cover 5 being positioned slightly inside the tip of the beak 8 when the free end 7 comes close to the beak 8. The cover 5 can rotate in a plane of the axis of the reservoir 1, while the free end 7 is in contact with the upper side of the beak 8 when the cover 5 pressed against the beak 8. An inner surface 9a of a pressing member 9, described below, faces upward when the cover 5 rests on the opposite side of the reservoir 1. The cover 5 is rotatable over a range of about 180°.

The inverted cup-shaped pressing member 9 is rotatably supported at a center portion of the cover 5 and is rotatable about the axis thereof. The pressing member 9 is positioned in such a manner that the pressing member 9 covers the support member 2 when the cover 5 rests against the reservoir 1. A rod 10 formed on the pressing member 9 projects through a hole 5a formed in the cover 5, and a disk-shaped handle 11 is fixed to the projecting portion of the rod 10. The rod 10 is rotatably supported by the cover 5, and the pressing member 9 is rotated by the handle 11.

Figure 2:
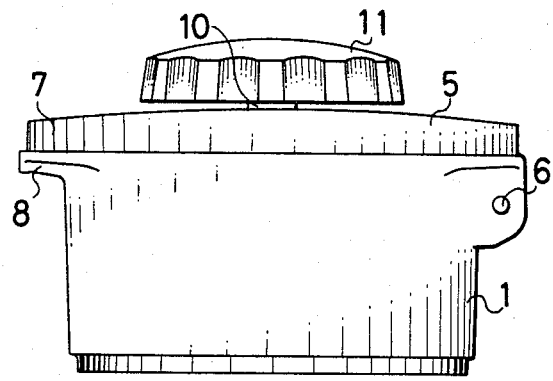
FIG. 2 is a side view of the embodiment.
Figure 3:
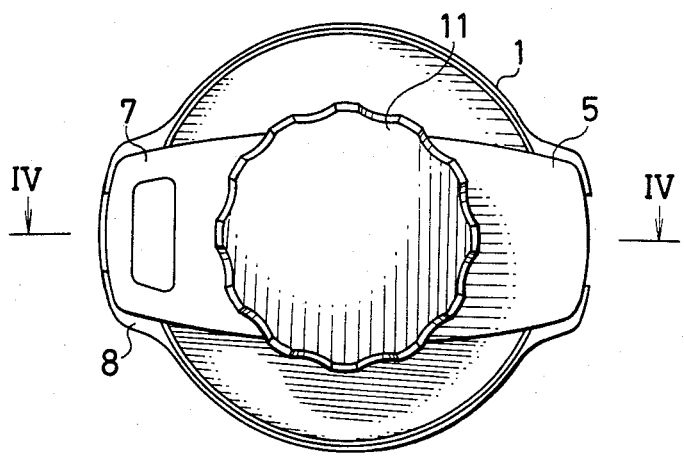
FIG. 3 is a plan view of the embodiment.
Figure 4:
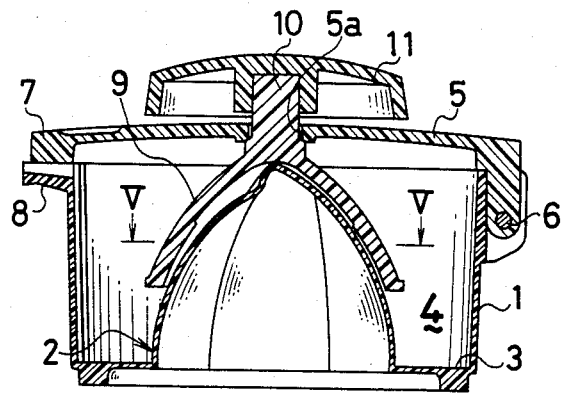
FIG. 4 is a sectional view along line IV—IV of FIG. 3.
Figure 5:
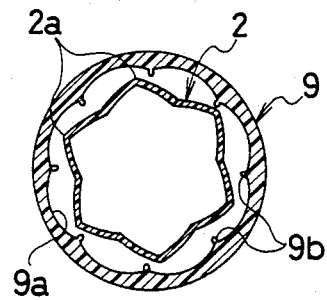
FIG. 5 is a cut end view along line V—V of FIG. 4.

FIG. 5 shows a sectional view obtained by cutting the support member 2 and the pressing member 9 through a horizontal plane. As seen in FIGS. 2 and 5, the support member 2 is hollow and has a shape similar to that of a lemon cut in half. The support member 2 has six ridges 2a which extend from the peak to the foot thereof. Eight ribs 9b are formed on the inner surface 9a of the pressing member 9 at constant intervals. These ribs 9b extend along the meridian of the pressing member 9 and portions between each of the ribs 9b are slightly concaved outward, i.e., toward the periphery of the pressing member 9.

According to the above-described construction of this embodiment of the present invention, juice is obtained from the citrus fruit as follows.

First, the cover 5 is pulled up and out so that the support member 2 is exposed, then a cut section of a citrus fruit, for example, an orange which has been cut in half, is placed on the support member 2 in such a manner that the cut section is in contact with the support member 2. The cover 5 is then pulled down and allowed to rest against the reservoir 1, so that the pressing member 9 fits over the outer surface of the orange. The cover 5 is pressed downward by gripping an under surface of the beak 8 and an upper surface of the free end 7, so that the pressing member 9 presses the orange against the support member 2. The orange is then crushed by this action, and the juice squeezed therefrom flows down to the holding-chamber 4. If, at the same time, the pressing member 9 is rotated by the handle 10, the ribs 9b of the pressing member 9 engage with the outer surface of the orange and cause the orange to rotate. This rotating action causes the flesh of the orange to be rubbed against the ridges 2a of the support member 2, thereby removing the flesh of the orange from the peel. The flesh is broken into many pieces and is mingled in the juice contained in the holding-chamber 4. The flesh is completely removed from the peel, and only the peel remains on the support member 2.

Thus, juice containing pieces of the flesh of the orange is obtained and contained in the reservoir 1. The cover 5 is then pulled up and out, releasing the pressing member 9 and uncovering the support member 2. The peel of the orange is removed from the pressing member 9 or the support member 2, and the juice is transferred to another container through the beak 8 by tilting the reservoir 1.

It should be noted that the pressing member 9 is not necessarily supported by the cover 5 in such a manner that the pressing member 9 can rotate only on a plane relative to that of the cover 5, the pressing member 9 may be allowed enough play relative to the cover 5 to enable the pressing member 9 to move sideways in the hole 5a of the cover 5.

The outer surface shape of member 2 and the inner surface shape of the pressing member 9 are not necessarily formed as shown in the drawings, although they should have at least convex or concave portions for rotating the fruit.

Still further, the handle 11 may be actuated by an electric motor.

While embodiments of the present invention have been described herein with reference to the attached drawings, many modifications and changes may be made by those skilled in this art without departing from the scope of the invention.

I claim:

1. A citrus fruit squeezer comprising:
   a deep-sided-dish-shaped reservoir having a cone-shaped fruit support member formed on a bottom thereof, a fruit to be squeezed being placed on said bottom, and an inner wall of said reservoir defining a juice-holding chamber in which juice squeezed from the fruit is contained;
   a cover hinged to a first peripheral portion of said reservoir, a free end of said cover being able to come close to a second peripheral portion of said reservoir,
   an inverted cup-shaped pressing member having a central axis and means mounting the pressing member on said cover only for rotatable movement relative to the cover about said central axis to enable an unlimited number of turns, said pressing member fitting over and around said fruit support member when said free end of said cover comes close to the second peripheral portion,
   a means for rotating said pressing member about the central axis thereof.

2. A citrus fruit squeezer according to claim 1, wherein said fruit support member is formed with ridges which extend from the peak to the foot of said support member.

3. A citrus fruit squeezer according to claim 1, wherein said pressing member has ribs which are formed on an inner surface thereof and extend along a meridian direction thereof.

4. A citrus fruit squeezer according to claim 1, wherein said rotating means has a handle connected to the pressing member by a rod which penetrates said cover.

5. A citrus fruit squeezer according to claim 1, wherein a beak is formed on the second peripheral portion, said beak protruding outward of said reservoir.

6. A citrus fruit squeezer according to claim 5, wherein the free end of said cover can come close to the end of said beak.

* * * * *